May 21, 1957   G. K. GANTSCHNIGG ET AL   2,792,599
SEAL

Filed June 13, 1955   3 Sheets-Sheet 1

INVENTORS

GOTTFRIED K. GANTSCHNIGG
HERBERT H. BUSCHERS

BY Benjamin G. Weil
ATTORNEY

May 21, 1957  G. K. GANTSCHNIGG ET AL  2,792,599
SEAL
Filed June 13, 1955  3 Sheets-Sheet 2

INVENTORS
GOTTFRIED K. GANTSCHNIGG
HERBERT H. BUSCHERS
BY Benjamin G. Weil
ATTORNEY

United States Patent Office 2,792,599
Patented May 21, 1957

2,792,599

SEAL

Gottfried Karl Gantschnigg and Herbert H. Buschers, Baltimore, Md., assignors to The Glenn L. Martin Company, Middle River, Md., a corporation of Maryland Application June 13, 1955, Serial No. 514,878

12 Claims. (Cl. 20—65)

This invention relates to a device for sealing of openings formed between adjacent surface members, and more particularly to a device which repeatedly seals a removable closure member to the walls of an opening in a body member, such as the waterproof sealing of a rotary door to the walls of a large irregular-shaped opening formed in the undersurface of a hull of a seaplane.

Present methods of sealing a closure member to a body member having an opening employ the use of a sealing compound or a rubber tubular form fixed around the walls of either member or both, whereby a seal is formed as the closure member is forced against the walls of the opening. This type of sealing presupposes a movement of either member against the other to engage their sealing areas. In cases where an opening is so irregular that the closure member cannot be properly sealed employing the above methods, the gap between the walls of these members can sometimes be overcome by the action of a pressure sealing device. In some instances where the area between the walls of adjacent members is not subjected to heavy external pressures, the force caused by inflation of rubber tubular forms placed between the walls of the members has provided an adequate seal. The effect of this sealing, however, is limited since it is not capable of sealing off relatively high gas or liquid pressures where required.

A need for a high pressure sealing device became apparent when a requirement was made for using a rotary stores carrier door in the underside of the hull of a seaplane. It has been determined experimentally that a seal sufficient to waterproof a gap formed between the walls of an opening in the hull and the wall of the rotary bomb carrier door in its closed position would have to withstand a varying water pressure that has a maximum value of 100 pounds per square inch against the exterior of the seal. Since present methods of sealing were found to be incapable of providing a proper seal for such conditions, a sealing device of another form was required. The present invention which answers this need was proven successful as determined from tests which simulated the various conditions under which it would operate.

It is an object of this invention, therefore, to provide a sealing device for the sealing of a displaceable closure member in an opening in a body member that has a surface subjected to high fluid pressures, wherein the walls of the closure member and/or the opening may be irregular.

Another object of this invention is to provide a sealing device which has a substantially uniform pressure bearing seal between the walls forming an opening in a surface member and the walls of a closure member.

Still another object of this invention is to provide a quick and easy method of repeatedly producing a positive seal between the walls of an enclosure member and those of an opening in a surface member.

Another object of this invention is to provide a quickly operable and easily controllable means for repeatedly breaking the above seal formed between the walls of an opening and those of a closure member.

Another object of this invention is to utilize part of the external pressure to which the sealing device is subjected for maintaining and reinforcing the action of the seal.

A feature of the invention is a provision of a seal which will maintain its sealing action regardless of shifting between the closure and the body while the seal is acting.

With the above and other objects in view, which will appear as the description proceeds, the invention resides in the combination and arrangement of parts and in the details of construction hereinafter described and claimed, it being understood that various changes in the precise embodiment of the invention herein disclosed may be made within the scope of what is claimed without departing from the spirit of the invention.

In the accompanying drawings which are made part of the specification, similar reference numbers designate corresponding parts throughout the several views.

Figure 1:
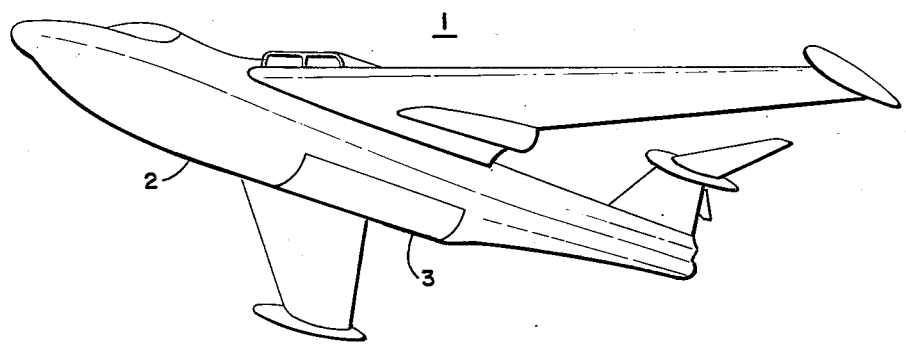
Fig. 1 is a perspective view of a seaplane illustrating the arrangement of the stores-carrying door to which the seal of the present invention can be beneficially applied.

Referring to the drawings, Fig. 1 shows a seaplane 1 of the flying boat type having a hull 2, part of which is designed to be movable from its normal position. This movable portion of the hull 2 may be a rotary stores carrier door 3 which is designed for and capable of turning on its lengthwise axis 180° from the closed position for the discharge of stores such as mines or bombs while traveling at relatively high air speeds.

Figure 2:
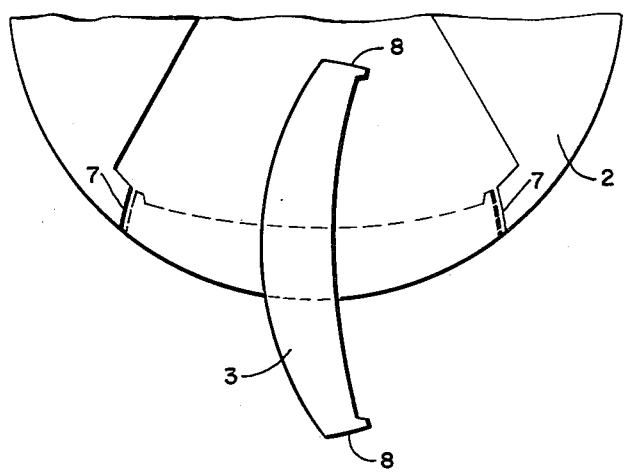
Fig. 2 is a cross sectional view taken athwartships through the aircraft at one end of the stores carrying door.

Fig. 2 is a cross sectional view normal to the lengthwise axis of the hull 2 showing the rotary stores carrier door 3 in a half-open position.

Various devices may be employed for operating the door 3 and locking it in an open or closed position. Examples of such devices are illustrated in the patent to Woollens et al. No. 2,634,656, dated April 14, 1953. Since these mechanisms form no part of the present invention, however, they are not illustrated or described herein.

Figure 3:
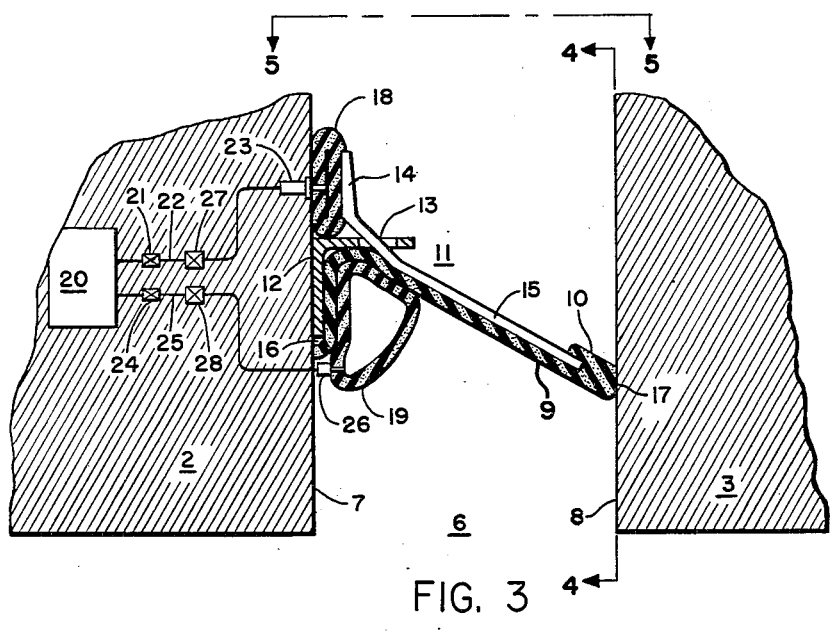
Fig. 3 is a detail cross section of the sealing mechanism for providing sealing action at the margins of the stores-carrying door, with the operating fluid supply shown diagrammatically.

Referring to Figs. 2 and 3, it will be seen that in order to provide sufficient clearance for the door 3 to move freely from open to closed position, there must exist between it and the hull 2 a clearance 6 which is substantial. For example, a gap of 1 to 2 inches has been found a practical value for certain purposes and will permit normal working and deflection of the parts under load, simultaneously avoiding any likelihood of interference under door opening or closing conditions.

The clearance 6, if there is to be provided partical dry storage condition for stores within the hull 2, must have an effective watertight seal which will prevent entrance of water while the seaplane 1 is landing on or supported on the water surface. To this end we provide a novel sealing means capable not only of maintaining a tight sealing action against high hydrostatic or hydrodynamic pressures between walls 7 and 8 of the hull 2 and the door 3, respectively, but also one which is readily retractable to remove it from the zone of conflict while the door 3 is being opened or closed. An additional property of our improved seal is that of high flexibility allowing it to follow the relative motions between the hull 2 and the door 3 to maintain its sealing operation even under extreme load variations.

The form of our seal presently preferred is illustrated in detail in Fig. 3. The seal shown consists essentially in a frame-shaped membrane 9, comprising a flap of waterproof material such as rubber. The membrane 9 is hingedly mounted on the walls in the hull 2, generally outwardly directed, and bearing firmly against the door 3 at its free margin 10. We prefer, for reasons which will hereinafter appear, to provide operating fingers 11 for the membrane 9 to stiffen the same so as to withstand exterior pressure, and to cause it to move as directed while still permitting independent movements of portions of the sealing edge.

The detailed form shown in Fig. 3 includes a continuously running angle 12 one leg of which lies normal to the wall 7 of the hull 2 and contains a plurality of perforations 13 for the insertion of the metal fingers 11. Each of these metal fingers 11 is suitably shouldered at a point in its length to act as a stop against the angle 12 where the fingers 11 may rest and pivot and rotate in any direction.

The fingers 11 form two unequal segments stemming from its point of pivot in the angle 12; a short segment which will be referred to as an unsealing segment 14 and a longer segment which will be referred to as a sealing segment 15. The sealing segment 15 supports and pivotally carries the membrane 9 which is permanently sealed at its one margin 16 to the wall 7 of the hull 2 immediately at the metal angle 12. The opposite margin 10 of the membrane 9 snugly embraces and is carried by the free end of the sealing segment 15 and is formed to constitute a suitable contact surface 17 for sealing the membrane 9 to the wall 8 of the door 3.

The pivotal movement of the fingers 11 can be intentionally effected by the inflation and deflation of rubber tubular forms conveniently positioned to act independently on the two segments 14 and 15 of the fingers 11. One said tubular form, hereinafter called unsealing tube 18 is positioned between the wall 7 of the hull 2 and the unsealing segments 14 immediately above the metal angle 12. The other tubular form, hereinafter called a sealing tube 19, is positioned between the hull 2 and the sealing segment 15 immediately below the metal angle 12. The pressure required for the inflation of the sealing and unsealing tubes 19 and 18, respectively, is drawn from ordinary pressure containing bottles or tanks 20 normally carried in a plane and indicated diagrammatically in Fig. 3.

Pressure valve 21 in an air line 22 allows air pressure to enter the unsealing tube 18 at tube connection 23. Pressure valve 24 in an air line 25 allows air pressure to enter the sealing tube 19 at the tube connection 26. Discharge valves 27 and 28 are provided for the individual escape of air pressure confined in the unsealing and sealing tubes 18 and 19, respectively. Valves 21, 24, 27, and 28 are preferably ganged or otherwise interconnected for concerted action so that the position of each valve will not be inconsistent with the desired setting of the others.

Figure 4:
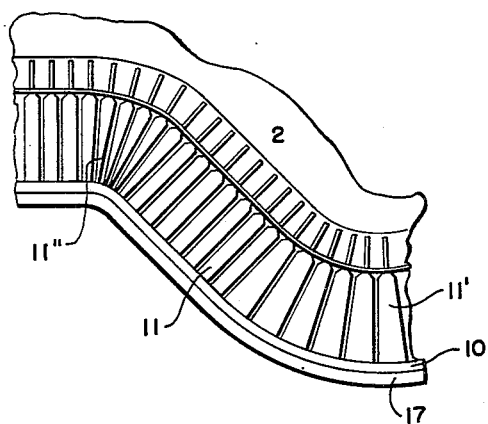
Fig. 4 is a detail elevation taken on line 4—4 of Fig. 3 and looking toward the left.

Fig. 4 represents an elevation view looking left in Fig. 3. It will be noted that the metal fingers 11 are spaced closely together in side-by-side relation for applying a maximum pressure bearing area to the seal contact surface 17 of the membrane 9 against the margins of the closure member 3.

It can also be seen in Fig. 4 that the seal need not be linear but can be undulated to conform to the shape of the joint to be sealed. Where the seal deviates from a straight line, the fingers 11' and 11'' can be provided which have tapered blades to provide for the requisite turning action.

Figure 5:
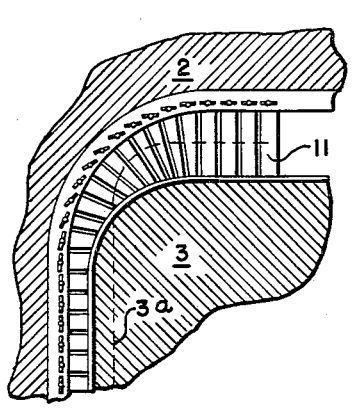
Fig. 5 is a partial horizontal section through the aircraft taken on line 5—5 of Fig. 3 to illustrate the operation of the seal during displacement of the parts.

Fig. 5 looks in a plan direction taken at the line 5—5 in Fig. 3 and illustrates the manner in which the fingers 11 permit the seal to operate at a corner. This view further demonstrates the slight cocking action of the fingers 11 which permits displacement of the door from normal position under extreme loads (which may occur during landing or the like) without disturbance of the sealing contact with the door. Normal position of the door 3 is shown in this view by broken lines 3a.

Figure 6:
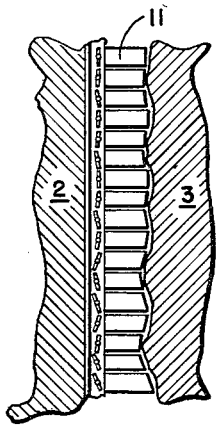
Fig. 6 is another partial horizontal section through the aircraft taken on line 5—5 of Fig. 3 to illustrate how the seal may accommodate to irregularities in a surface.

Fig. 6 is a view similar to Fig. 5 but showing the manner in which the fingers 11 act to permit the seal to follow accurately and accommodate itself to any irregularities which might appear in the sealing surface of the door 3.

It should be noted, especially in Fig. 3, that the fingers 11 and membrane 9 are hinged to the hull 2 and that their direction of progress toward the door 3 is largely also towards the outer or pressurized surface of the seaplane 1. This disposition of parts enables the seal to take advantage of the applied pressure and use it to augment the sealing action. In this connection, the membrane 9 will be seen to rest against the outer or pressure side of fingers 11 which act to back up the membrane 9 against flexing under the pressure and to stiffen the same transversely of the joint, so that the stiffened membrane 9 can act as a chevron element receiving a sealing impetus which is increased as the pressure tending to force fluid by the seal is increased. At the same time the membrane 9 is very flexible in all other directions and accommodates itself readily to the vagaries of the parts between which it is intended to provide a seal.

It has been found most practical at present to provide a membrane 9 whose contact surface 17 has a normal length fitting the sealing surface on the door fairly snugly, and such that at least some stretching of the contact surface 17 is required to fully retract the seal. However, it will be understood that under proper conditions, the contacting surface 17 may operate in reverse and suffer a compacting action as the sealing contact is made. The freedom with which the seal of this invention accommodates itself to changes in position of the door 3 is clearly illustrated in Fig. 5 by the displacement of the door 3 from its normal centered position as indicated by the broken lines 3a.

In operation of this sealing device the membrane 9 is normally in a sealed position as shown in Fig. 3. In this position the stores carrier door 3 forms part of the general contour of the hull 2 as shown in Fig. 1. This position is obtained by the force of the inflated sealing tube 19 acting on the sealing segments 15 of metal fingers 11. The sealing segments 15 carry and support the flexible membrane 9 in this position and press the seal contact surface 17 of the membrane 9 against the walls 8 of the door 3. In areas where the walls 8 of the door 3 are sharply contoured, the metal fingers 11 at position of seal tend to form or shape the flexible membrane 9 by locally conforming it to the surface of the walls 8 of the door 3. The external pressure to which the membrane 9 is subjected when the aircraft 1 is in contact with the surface of the water acts upwardly against and normal to the membrane 9 and hence against the fingers 11, and thus urges the sealing surface 17 even more firmly against the walls 8 of the door 3. Inflating the unsealing tube 18 with pressurized air to force the sealing segments 15, by the pivotal action previously described, away from the walls 8 of the door 3 wil provide clearance for the door 3 to move in opening and closing.

The normal opening of the rotary stores carrier door 3 occurs in flight where the external pressure, namely air, bearing on the membrane 9 is much less than that in water. Therefore, the force required to open the seal does not include that to overcome the external force of the water.

After the rotary door 3 is closed as shown in Fig. 1, air pressure is again supplied to the sealing tube 19 causing its inflation to exert force on the sealing segments 15, which in turn presses the seal contact surface 17 of the membrane 9 against the walls 8 of the door 3, thus again establishing the required seal to ready the aircraft for water contact.

While the invention has been described primarily for use with a rotary stores carrier door in the hull of a seaplane, it will be realized that the sealing membrane may be used for sealing purposes between spaced adjacent walls of two body members in the same manner as hereinbefore described without impairing its advantageous features.

While the invention has been shown and described in considerable detail, the description is not to be considered as limiting the invention which is to be construed as including those structures which fall within the scope of the language used in the appended claims.

We claim:

1. A seal for repeated watertight connections between spaced members comprising: a waterproof membrane secured at one margin to one of the said members; means including a plurality of discrete fingers for firmly pressing the remaining margin of the said membrane to the remaining one of the said members; and means for releasing the said membrane from the said remaining member.

2. A seal for repeated watertight connection between spaced members comprising: a plurality of metal fingers pivotally secured to one of the said members; a waterproof membrane covering the said fingers and secured at one margin to the last said member; and means for actuating the said fingers to firmly press the opposite margin of the said membrane to and release it from the remaining one of the said members.

3. A seal for repeated watertight connection between spaced members comprising: a plurality of metal fingers pivotally secured to one of the said members; a waterproof membrane covering the said fingers and secured at one margin to the last said member and at its opposite margin to the ends of the said fingers; and means for actuating the said fingers to firmly press the said opposite margin of said membrane to and release it from the remaining one of the said members.

4. A seal for repeated watertight connection between the walls of a movable closure member and the walls of a body member that form an opening therein for receiving the said closure member, comprising: a plurality of side-by-side rigid fingers pivotally secured to said walls of the said body member; a waterproof membrane covering the said fingers and secured at one margin to the said walls of the said body member; means for actuating the said fingers to effect movement of the said membrane relative to the said closure member from a sealably engaged position to a retracted position; and means to effect movement of the said membrane relative to the said closure member from a retracted released position to a sealably engaged position.

5. A seal for repeated watertight connection between the walls of a movable closure member and the walls of a body member that form an opening therein for receiving the said closure member, comprising: a plurality of side-by-side rigid fingers pivotally secured to the said walls of the said body members; a waterproof membrane covering the said fingers and secured at one margin to the said walls of the said body member; means for actuating the said fingers to effect movement of the said membrane relative to the said closure member from a sealably engaged position to a totally disengaged position; and means to effect movement of the said membrane relative to the said closure member from a retracted released position to a sealably engaged position.

6. In a device having a member with walls forming an opening therein, and a closure member for said opening, a mechanism providing a watertight seal between the said closure member and the said walls of the said opening, comprising: a flexible frame-shaped membrane of waterproof material having inner and outer margins; means securing one of said margins of the said membrane in a watertight fashion to one of the said members; a resilient sealing formation on the remaining one of said margins movable into and out of contact with the other of the said members; means including a plurality of discrete fingers rendering said membrane relatively stiff between said margins but allowing it to conform to a variable contour; means carried by said one member for urging said formation into contact with the said other member; and means carried by the said one member for withdrawing the said membrane from the said other member.

7. A seal for repeated watertight connection between a removable closure member and the walls of a body member forming a corresponding opening therein, comprising: a plurality of side-by-side rigid fingers pivotally secured to the said walls of the said body member; a flexible frame-shaped watertight membrane having inner and outer margins covering said fingers and secured at one of said margins to the said walls; means including an inflatable tubular form for actuating said fingers to firmly press the remaining margin of said membrane against the said closure member; and means including another inflatable tubular form for actuating said fingers to withdraw the said remaining margin of the said membrane from the said closure member.

8. A seal for repeated watertight connection between a rotary stores carrier door in a seaplane and the walls of the hull thereof forming an opening therein, comprising: a plurality of side-by-side rigid fingers pivotally secured to the said walls forming the said opening; a flexible frame-shaped watertight membrane having inner and outer margins covering said fingers and secured at one of said margins to said hull around said opening; means including an inflatable tubular form for actuating said fingers to firmly press the remaining margin of said membrane to said closure member; and means including another inflatable form for actuating said fingers to withdraw the remaining margin of said membrane from said closure member.

9. In a device having a member with walls forming an opening therein and a closure member for said opening, a mechanism providing a seal between the said closure member and the said walls for withstanding pressures applied to one side of the first said member and the said closure member, comprising: a flexible frame-shaped membrane device of waterproof material having inner and outer margins; one of the said margins of said membrane device being secured in watertight fashion to one of said members, and at least portions of the other having a resilient sealing formation and being movable into and out of contact with the other member; said membrane device extending from its secured margin to the said formation in a direction substantially towards the pressurized side of said first member and away from the nonpressurized side thereof; means including a plurality of discrete fingers rendering said device relatively stiff between said margins but allowing it to conform to a variable contour; means carried by said one member for urging said formation into contact with said other member and means for disengaging said formation from contact with said other member.

10. In a device having a member with walls forming an opening therein and a closure member for said opening, a mechanism providing a watertight seal between the said closure member and the said walls for withstanding pressures applied to one side of the first said member and the said closure member, comprising: a flexible frame-shaped membrane device of waterproof material having inner and outer margins; one of the said margins of said device being secured in watertight fashion to one of said members, and at least portions of the other having a resilient sealing formation and being movable into and out of contact with the other member; said membrane device extending from its secured margin to the said formation in a direction substantially towards the pressurized side of said first member and away from the nonpressurized side thereof; means including a plurality of discrete fingers rendering said device relatively stiff in a direction across the same between said margins but allowing it to conform to a variable contour, and means carried by said one member for urging said formation into contact with said other member, said device being disposed on the side of said stiffening means receiving the pressure when the formation is in sealing contact with the other member.

11. A movable seal for use between relatively movable first and second members comprising a plurality of discrete fingers pivotally mounted upon said first member, and a sealing member disposed adjacent said fingers and at least partially supported thereby, said fingers being movable with respect to said second member between a retracted position, and an extended position in which a margin of said sealing member is caused by said fingers to be in firm contact with said second member.

12. A movable seal for use between relatively movable first and second members comprising a plurality of discrete fingers pivotally mounted upon said first member, and a sealing member disposed adjacent said fingers and at least partially supported thereby, said fingers being movable with respect to said second member between a retracted position, and an extended position in which a margin of said sealing member is caused by said fingers to be in firm contact with said second member, said fingers also being movable with respect to each other, to allow said sealing member to conform to a variable contour.

References Cited in the file of this patent
UNITED STATES PATENTS

| | | |
|---|---|---|
| 242,154 | Randolph | May 31, 1881 |
| 937,193 | Steger | Oct. 19, 1909 |